US011240757B2

United States Patent
Han

(10) Patent No.: US 11,240,757 B2
(45) Date of Patent: Feb. 1, 2022

(54) ELECTRONIC DEVICE

(71) Applicants: Chengdu BOE Optoelectronics Technology Co., Ltd., Sichuan (CN); BOE Technology Group Co., Ltd., Beijing (CN)

(72) Inventor: Ting Han, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/767,293

(22) PCT Filed: Dec. 26, 2019

(86) PCT No.: PCT/CN2019/128651
§ 371 (c)(1),
(2) Date: May 27, 2020

(87) PCT Pub. No.: WO2020/143465
PCT Pub. Date: Jul. 16, 2020

(65) Prior Publication Data
US 2021/0250856 A1 Aug. 12, 2021

(30) Foreign Application Priority Data
Jan. 8, 2019 (CN) .......................... 201910014705.1

(51) Int. Cl.
*H04M 1/00* (2006.01)
*H04W 52/02* (2009.01)
(Continued)

(52) U.S. Cl.
CPC ........ *H04W 52/027* (2013.01); *G06F 1/1652* (2013.01); *G06F 1/3218* (2013.01);
(Continued)

(58) Field of Classification Search
CPC .. H04W 52/027; G06F 1/1652; G06F 1/3218; H04M 1/0268; H04M 1/0243;
(Continued)

(56) References Cited

U.S. PATENT DOCUMENTS

| 10,783,852 B2 | 9/2020 | Zeng et al. |
| 2004/0104910 A1* | 6/2004 | Mori .................. H04W 52/027 345/212 |

(Continued)

FOREIGN PATENT DOCUMENTS

| CN | 106940965 A | 7/2017 |
| CN | 107591427 A | 1/2018 |

(Continued)

OTHER PUBLICATIONS

Office Action dated Feb. 6, 2020, issued in counterpart to CN Application No. 201910014705.1, English translation (15 pages).
(Continued)

*Primary Examiner* — Andrew Wendell
(74) *Attorney, Agent, or Firm* — Westerman, Hattori, Daniels & Adrian, LLP

(57) ABSTRACT

The present disclosure discloses an electronic device, including: an electronic device body, with a display screen disposed on one side of the electronic device body, the electronic device body including at least one folding area and a non-folding area, and the electronic device body and the display screen being foldable along the folding area; a folding detection apparatus, disposed on the electronic device body and configured to detect a degree of folding of the electronic device body and send the detected signal to a processor of the electronic device body, the processor being capable of adjusting a display state of the display screen according to the signal detected by the folding detection apparatus.

9 Claims, 3 Drawing Sheets

(51) Int. Cl.
    *G06F 1/16* (2006.01)
    *G06F 1/3218* (2019.01)
    *H04M 1/02* (2006.01)

(52) U.S. Cl.
    CPC ....... *H04M 1/0243* (2013.01); *H04M 1/0268* (2013.01); *H04M 2250/12* (2013.01); *H04M 2250/16* (2013.01)

(58) Field of Classification Search
    CPC ......... H04M 2250/16; H04M 2250/12; H04M 1/021; H04M 1/0214; H04M 1/0233; H04M 1/0266
    See application file for complete search history.

(56) References Cited

U.S. PATENT DOCUMENTS

| | | | | |
|---|---|---|---|---|
| 2012/0026069 | A1* | 2/2012 | Ohsaki | G06F 3/0481 345/1.2 |
| 2012/0235894 | A1* | 9/2012 | Phillips | G09G 3/03 345/156 |
| 2013/0127724 | A1* | 5/2013 | Liu | G06F 1/1677 345/168 |
| 2014/0043121 | A1* | 2/2014 | Sartee | H05K 5/02 335/219 |
| 2015/0227271 | A1* | 8/2015 | Kang | G06F 3/0482 715/781 |
| 2016/0195938 | A1* | 7/2016 | Kim | H04B 1/3827 345/156 |
| 2018/0040674 | A1* | 2/2018 | Du | H01L 27/3248 |
| 2018/0081398 | A1* | 3/2018 | Shin | G09G 5/005 |
| 2018/0240439 | A1 | 8/2018 | Zeng et al. | |
| 2019/0251927 | A1 | 8/2019 | Ma | |

FOREIGN PATENT DOCUMENTS

| | | |
|---|---|---|
| CN | 207557906 U | 6/2018 |
| CN | 108304061 A | 7/2018 |
| CN | 108666355 A | 10/2018 |
| CN | 108845621 A | 11/2018 |
| CN | 108874211 A | 11/2018 |
| CN | 109714813 A | 5/2019 |

OTHER PUBLICATIONS

Office Action dated Jul. 13, 2020, issued in counterpart to CN Application No. 201910014705.1, English translation (13 pages).

* cited by examiner

ELECTRONIC DEVICE

CROSS-REFERENCE TO RELATED APPLICATION(S)

The present disclosure claims priority to Chinese Patent Application No. 201910014705.1, filed on Jan. 8, 2019, and titled "Electronic Device," the entire disclosure of which is incorporated herein by reference.

TECHNICAL FIELD

The present disclosure relates to the technical field of electronic device, and in particular to an electronic apparatus.

BACKGROUND

With the continuous development of display technology, portable electronic devices such as mobile phones and tablet computers can be seen everywhere in life. Expanding the display screen of the electronic device can improve the user's visual enjoyment, but the expansion of the display screen will affect the portability of the electronic device, so the electronic device with a foldable screen comes into being.

In the prior art, the conventional foldable electronic device is designed such that the electronic device body can be folded together with the display panel contained therein, and the user can adjust the opening and closing angle of the foldable electronic device according to needs by folding, which improves the portability of the electronic device.

When performing the above method, there are at least the following problems in the prior art. In the daily use of the user, when the electronic device is folded at a certain angle, or when a screen is completely folded and not used, the display panel of the electronic device is always in the bright state, the display state of the display screen will not be adjusted accordingly with the folding operation of the electronic device, which will cause a certain waste of power consumption.

SUMMARY

In view of this, the embodiments of the present disclosure provide an electronic device, with the main object to solve the problem that the display state of the foldable display screen will not be adjusted accordingly with the folding operation of the electronic device, which will cause waste of power consumption.

To achieve the above object, the present disclosure mainly provides the following technical solutions.

In one aspect, an embodiment of the present disclosure provides an electronic device, the electronic device including: an electronic device body, with a display screen disposed on one side of the electronic device body, the electronic device body comprising at least one folding area and a non-folding area, and the electronic device body and the display screen being foldable along the folding area; a folding detection apparatus, disposed on the electronic device body and configured to detect a degree of folding of the electronic device body and send the detected signal to a processor of the electronic device body, the processor being capable of adjusting a display state of the display screen according to the signal detected by the folding detection apparatus.

Further, the folding detection apparatus is disposed in the folding area.

Further, the folding detection apparatus is disposed in the folding area and the non-folding area adjacent to the folding area.

Further, a number of the folding detection apparatus is set to two, and the two folding detection apparatuses are arranged symmetrically on the electronic device body along a length direction of the folding area.

Further, the folding detection apparatus comprises at least one Wheatstone bridge; the Wheatstone bridge comprises four resistors, two power signal input terminals and a detection element, and an output terminal of the detection element is electrically connected to the processor; wherein, at least one of the four resistors is provided as a varistor, and the at least one varistor is disposed in the folding area.

Further, the detection element is provided as a galvanometer.

Further, the four resistors comprise a first resistor, a second resistor, a third resistor, and a fourth resistor, the two power signal input terminals comprise a first power signal input terminal and a second power signal input terminal, and the detection element comprise a first detection terminal and a second detection terminal; a first terminal of the first resistor and a first terminal of the second resistor are electrically connected to the first power signal input terminal, a second terminal of the fourth resistor and a second terminal of the third resistor are electrically connected to the second power signal input terminal, a second terminal of the first resistor and a first terminal of the fourth resistor are electrically connected to the first detection terminal, and a second terminal of the second resistor and a first terminal of the third resistor are electrically connected to the second detection terminal.

Further, the first resistor and the fourth resistor are disposed in the folding area, and the second resistor and the third resistor are disposed in the non-folding area adjacent to the folding area;

wherein, at least one of the first resistor and the fourth resistor is a varistor.

Further, the display screen comprises a plurality of display panels, and adjacent display panels are rotatably connected.

Further, the display screen is provided as an integrated flexible display panel.

In the electronic device according to the embodiment of the present disclosure, the electronic device body includes a folding area and a non-folding area, and the electronic device body and the display screen can be folded along the folding area. By providing a folding detection apparatus for detecting the degree of folding of the folding area, and by connecting the folding detection apparatus to the processor of the electronic device body, the display state of the display screen can be adjusted according to the degree of folding of the folding area, so that when the electronic device body is folded at a certain angle or when it is completely folded and not used, the display screen may change with the folded state of the electronic device body, so as to save power.

DETAILED DESCRIPTION

To further elaborate on the technical measures adopted by the present disclosure to achieve the intended disclosure purpose and their effects, the specific implementation, structure, features and functions of the electronic device according to the present disclosure are described in the following in conjunction with the drawings and preferred embodiments.

Figure 1:
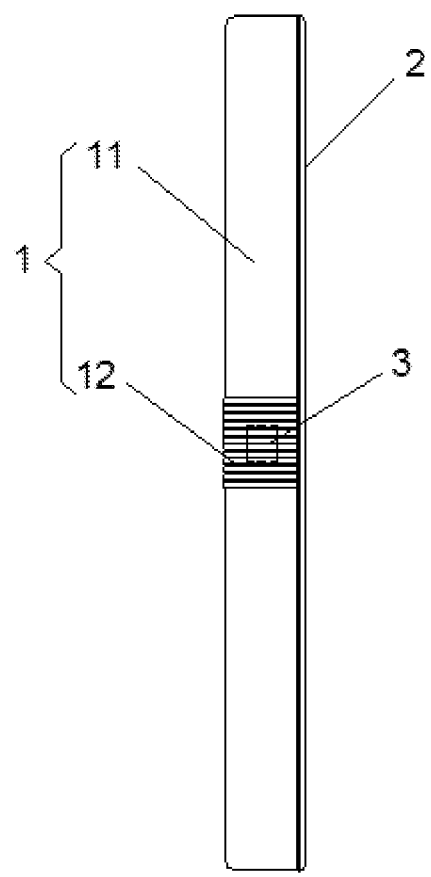
FIG. 1 is a schematic structural diagram of an electronic device according to an embodiment of the present disclosure.
Figure 2:
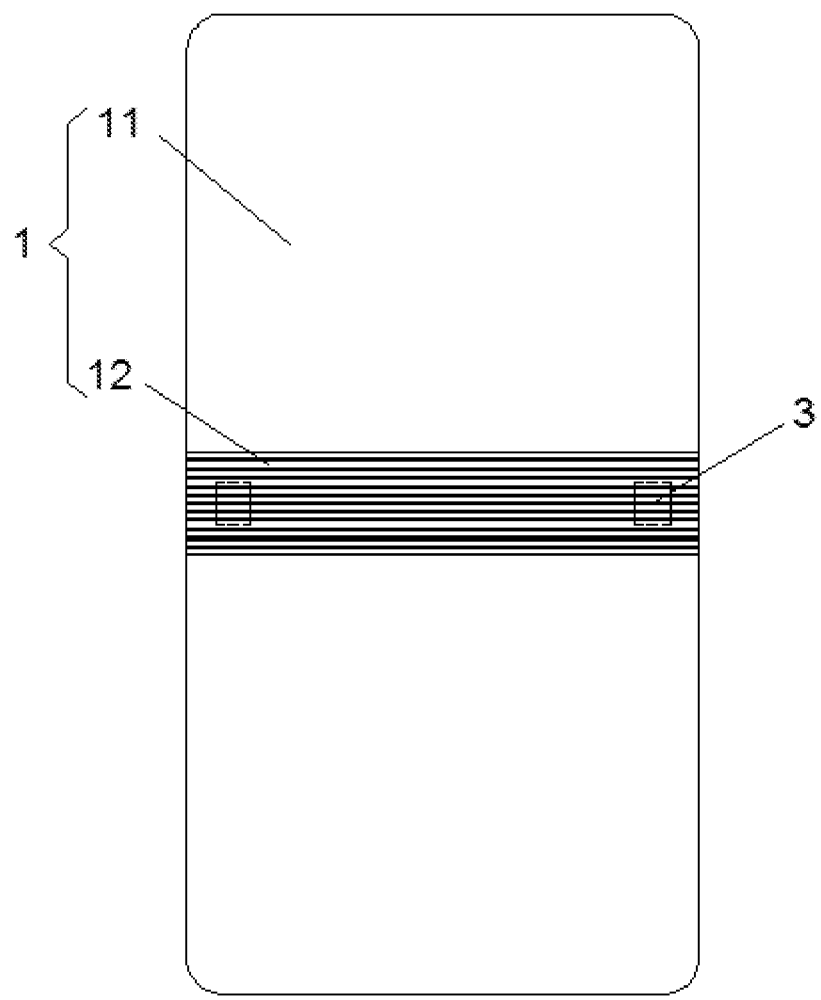
FIG. 2 is another schematic structural diagram of an electronic device according to an embodiment of the present disclosure.

As shown in FIGS. 1 and 2, in one aspect, an embodiment of the present disclosure provides an electronic device, the electronic device including: an electronic device body 1, with a display screen 2 disposed on one side of the electronic device body 1, the electronic device body 1 including at least one folding area 12 and a non-folding area 11, and the electronic device body 1 and the display screen 2 being foldable along the folding area 12; a folding detection apparatus 3, disposed on the electronic device body 1 and configured to detect a degree of folding of the electronic device body 1 and send the detected signal to a processor of the electronic device body 1, the processor being capable of adjusting a display state of the display screen 2 according to the signal detected by the folding detection apparatus.

Specifically, the electronic device body 1 may be an electronic device with a display function, such as a mobile phone, a tablet computer, and the like. The electronic device body 1 includes a folding area 12 and a non-folding area 11, and the folding area 12 and the non-folding area 11 may be made of different materials. For example, the folding area 12 here may be an area made of silicone material and having a flexible structure, which is convenient for the electronic device body 1 to perform bending, folding and other operations through the folding area 12. The non-folding area 11 may be made of a hard shell such as metal used in electronic devices such as mobile phones in the prior art, so as to protect the display screen 2 and other elements of the electronic device body 1. By providing the folding area 12, the electronic device body 1 and the display screen 2 can be folded. The display screen 2 provided on one side of the electronic device body 1 may be an integrated flexible display screen which covers the display screen body 1, that is, both the portions corresponding to the folding area 12 and the non-folding area 11 have a display function, and the flexible display panel may be folded together with the folding area 12. Alternatively, the display screen 2 may include a plurality of independent display panels, and the plurality of display panels may be hard display screens. In this case, the position corresponding to the folding area 12 may not be covered by the display screen 2 to facilitate the folding of the electronic device body 1. The folding detection apparatus 3 is configured to detect the folding degree of the folding area 12. By connecting the folding detection apparatus 3 to the processor of the electronic device body 1, the display state of the display screen 2 can be adjusted according to the degree of folding of the folding area 12. The display state here may be the display brightness of the display screen 2, the response speed of the display screen 2, or the like. For example, when the degree of folding of the electronic device body 1 and the display screen 2 in the direction of snap closure increases, through the detection of the folding detection apparatus 3, the processor controls the display brightness of the display screen 2 to gradually dim to extinction, and the processor may also control the response speed of the display screen 2 to gradually slow down, which can reduce power waste. The folding detection apparatus 3 may be disposed in the folding area 12 or partially in the folding area 12.

An embodiment of the present disclosure provides an electronic device. The electronic device body includes a folding area and a non-folding area. The electronic device body and the display screen can be folded along the folding area. By providing a folding detection apparatus for detecting the degree of folding of the folding area, and by connecting the folding detection apparatus to the processor of the electronic device body, the display state of the display screen can be adjusted according to the degree of folding of the folding area, so that when the electronic device body is folded at a certain angle or when it is completely folded and not used, the display screen can change with the folded state of the electronic device body, so as to save power.

As further shown in FIGS. 1 and 2, the folding detection apparatus 3 is disposed in the folding area 12.

Specifically, the folding detection apparatus 3 may be disposed in the folding area 12, so as to directly detect the force deformation of the folding area 12. For example, the folding detection apparatus 3 may be disposed at an intermediate position in the width direction of the folding area 12. When the folding detection apparatus 3 is disposed in this way, it can measure the force condition of the folding area 12 more accurately, and then send the measured signal to the processor of the electronic device body 1, so that the processor can control the display of the display screen 2 more accurately and effectively.

Further, the folding detection apparatus 3 is disposed in the folding area 12 and in the non-folding area 11 adjacent to the folding area 12.

Specifically, the folding detection apparatus 3 may be disposed in the folding area 12 and the non-folding area 11 adjacent thereto. For example, the detection element and the sensing element of the folding detection apparatus 3 may be disposed in the folding area 12, and particularly may be disposed at an intermediate position in the width direction of the folding area 12. The folding detection apparatus 3 thus disposed can more accurately measure the force condition of the folding area 12, so that the processor of the electronic device body 1 can more accurately control the display state of the display screen 2, that is, control the display of the display screen 2 more accurately and effectively. When only the sensing element of the folding detection apparatus 3 is disposed in the folding area 12 and the other elements are disposed in the non-folding area 11, the number of elements disposed in the folding area 12 can be reduced, so that the folding of the folding area 12 is not affected. Also, the width of the folding area 12 can be appropriately reduced, and repeated folding of the folding area 12 does not affect the service life of the elements.

As further shown in FIG. 2, the number of folding detection apparatuses 3 is set to two, and the two folding detection apparatuses 3 are symmetrically arranged on the electronic device body 1 along the length direction of the folding area 12.

Specifically, the number of folding detection apparatuses 3 may be set to two, and the number of folding detection apparatuses 3 may be set to at least two. Providing a plurality of folding detection apparatuses 3 can enhance the detection accuracy and reliability of the folding degree of the folding area 12 of the electronic device body 1. For example, when two folding detection apparatuses 3 are provided, whether the folding detection apparatuses 3 are disposed only inside the folding area 12 or the folding detection apparatuses 3 are disposed inside both the folding area 12 and the non-folding area 11, the two folding detection apparatuses 3 may be disposed at positions on both sides of the electronic device body 1, and the two folding detection apparatuses 3 are in a symmetric relationship with each other in the length direction of the folding area 12. The two folding detection apparatuses 3 symmetrically arranged in this way can more reliably and effectively detect the folding situation of the folding area 12 of the electronic device body 1, so that the processor of the electronic device body 1 can more accurately control the display state of the display screen 2.

Figure 3:
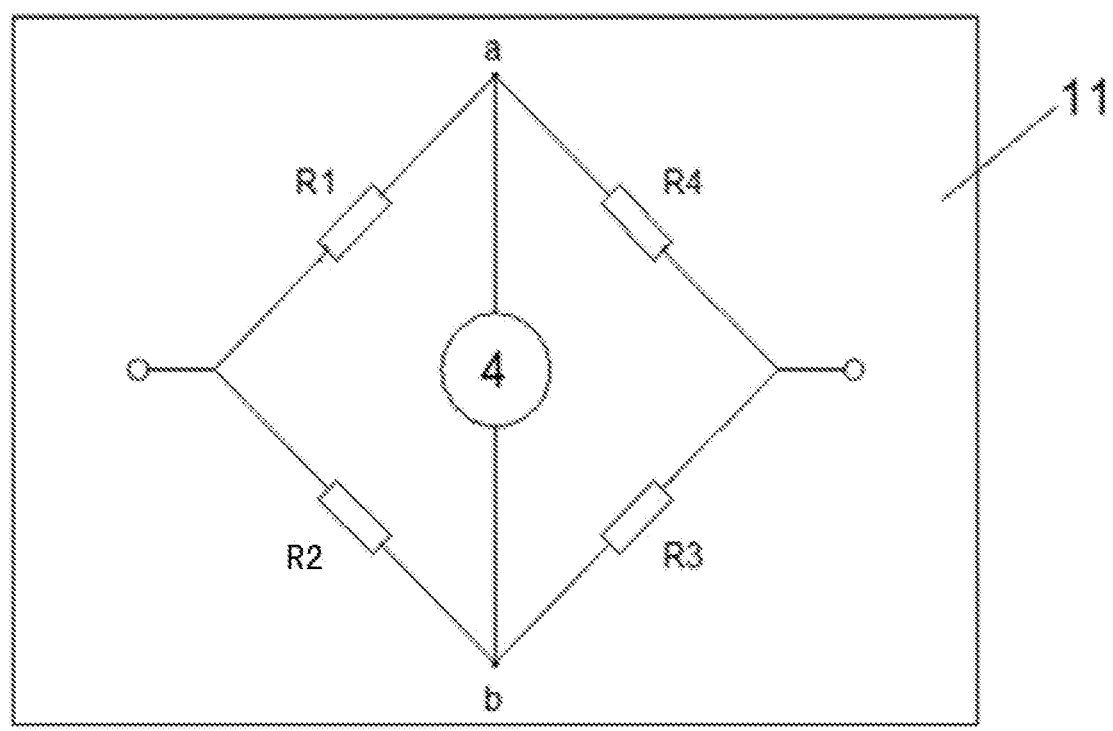
FIG. 3 is a schematic structural diagram of a folding detection apparatus for an electronic device according to an embodiment of the present disclosure.

As further shown in FIG. 3, the folding detection apparatus 3 includes at least one Wheatstone bridge. The Wheatstone bridge includes four resistors R1-R4, two power signal input terminals and a detection element 4. The output terminal of the detection element 4 is electrically connected to the processor. At least one of the four resistors is provided as a varistor, and the at least one varistor is disposed in the folding area 12.

Specifically, the folding detection apparatus 3 may include one or more Wheatstone bridges. When a plurality of Wheatstone bridges are provided, the plurality of Wheatstone bridges may be arranged side by side in the direction of folding. The Wheatstone bridge may include four resistors, two power signal input terminals, and a detection element 4, and at least one of the four resistors is provided as a varistor, and the at least one varistor is disposed in the folded region 12. The four resistors forming the Wheatstone bridge are connected in series two by two. After the two series branches are connected in parallel, the reference voltage is provided through the two power signal input terminals. The detection element 4 is configured to detect the changes of the voltage difference between the two series branches. When the display screen of the electronic device body 1 is fully expanded, the Wheatstone bridge is in a balanced state. When the electronic device body 1 is folded, the folding area 12 will be deformed by force, the resistance value of the varistor disposed in the folding area 12 will change after being pressed, and the balance of the Wheatstone bridge will be destroyed. As the folding degree of the folding area 12 increases, the resistance value of the varistor also gradually increases, so that the voltage difference between the two series branches also increases. The processor may control the display brightness of the display screen 2 and adjust the response speed of the display screen according to the change in the voltage difference measured by the detection element 4.

As further shown in FIG. 3, the detection element 4 is provided as a galvanometer.

Specifically, the detection element 4 may be a galvanometer, or other pressure-sensitive detection elements in the prior art. The galvanometer can determine whether the circuit is in a balanced state according to the current flowing therethrough. The output terminal of the galvanometer is connected to the processor of the electronic device body 1. The processor of the electronic device body 1 may control and adjust the display status of the display screen 2, such as the display brightness, the screen response speed, and the like, according to the signal output from the output terminal of the galvanometer.

As further shown in FIG. 3, the four resistors include a first resistor R1, a second resistor R2, a third resistor R3, and a fourth resistor R4. The two power signal input terminals include a first power signal input terminal and a second power signal input terminal. The detection element 4 includes a first detection terminal and a second detection terminal. The first terminal of the first resistor R1 and the first terminal of the second resistor R2 are electrically connected to the first power signal input terminal. The second terminal of the fourth resistor R4 and the second terminal of the third resistor are electrically connected to the second power signal input terminal. The second terminal of the first resistor R1 and the first terminal of the fourth resistor R4 are electrically connected to the first detection terminal, and the second terminal of the second resistor R2 and the first terminal of the third resistor R3 are electrically connected to the second detection terminal.

Specifically, the Wheatstone bridge includes four resistors, two power signal input terminals and a detection element 4, and when connected, these elements are connected together through metal traces. For example, the first resistor R1 and the fourth resistor R4 may be connected in series, and the second resistor R2 and the third resistor R3 may be connected in series. At the positions where the two series circuits are connected, the reference voltage may be provided by the first power signal input terminal and the second power signal input terminal, respectively. A node a may be provided between the first resistor R1 and the fourth resistor R4, and a node b may be provided between the second resistor R2 and the third resistor R3. The node a is connected to the first detection terminal of the detection element, and the node b is connected to the second detection terminal of the detection element, that is, the detection element can detect the changes of the voltage difference between the node a and the node b. When the display screen of the electronic device body is fully expanded, the Wheatstone bridge is in a balanced state, and the voltage difference between node a and node b is zero. When the display screen of the electronic device body is folded by the folding area, since at least one of the first resistor R1, the second resistor R2, the third resistor R3, and the fourth resistor R4 is provided as a varistor and the at least one varistor is disposed in the folding area, the resistance value of the varistor changes during the process of the folding area being folded and pressed, and the balance of the Wheatstone bridge is destroyed. The resistance value of the varistor will gradually increase, so that the voltage difference between node a and node b also increases. The detection element detects the voltage difference between node a and node b, and the processor may control and adjust the display brightness and the screen response speed of the display screen according to the change in the voltage difference measured by the detection element.

Further, the first resistor R1 and the fourth resistor are disposed in the folding area 12, and the second resistor R2 and the third resistor R3 are disposed in the non-folding area 11 adjacent to the folding area 12; wherein, at least one of the first resistor R1 and the fourth resistor R4 is a varistor.

Specifically, when the folding detection apparatus 3 is disposed in the folding area 12 and the non-folding area 11 adjacent thereto, the sensing element of the folding detection apparatus 3 may be disposed in the folding area 12. For example, when at least one of the first resistor R1 and the fourth resistor R4 is provided as a varistor, the first resistor R1 and the fourth resistor R4 may be disposed in the folding area 12, and the second resistor R2 and the third resistor R3 may be disposed in the non-folding area 11 adjacent to the folding area 12. The detection element 4 may be disposed in the folding area 12 or in the non-folding area 11. When the folding detection apparatus 3 is provided in both the folding area 12 and the non-folding area 11 adjacent thereto, the number of elements disposed in the folding area 12 can be reduced, so that the folding of the folding area 12 is not affected. Also, the width of the folding area 12 can be appropriately reduced, and repeated folding of the folding area 12 does not affect the service life of the elements.

Further, the display screen 2 includes a plurality of display panels, and adjacent display panels are rotatably connected.

Specifically, the display screen 2 provided on one side of the electronic device body 1 may further include a plurality of display panels, and the plurality of display panels are provided independently of each other. For example, the plurality of display panels here may be hard display panels. In this case, the position corresponding to the folding area 12 may not be covered by the display screen 2 to facilitate the folding of the electronic device body 1. Alternatively, the plurality of display panels may be flexible display panels.

Further, the display screen 2 is provided as an integrated flexible display panel.

Specifically, the display screen 2 provided on one side of the electronic device body 1 may be an integrated flexible display screen which covers the display screen body 1, that is, both the portions corresponding to the folding area 12 and the non-folding area 11 may have a display function. The size of the non-luminous area of the electronic device body 1 can be reduced, that is, the screen ratio can be increased. The flexible display screen has the characteristics of being deformable and bendable, so the flexible display panel can be folded together with the folding area 12. Moreover, the flexible display screen also has the characteristics of low power consumption, light weight, and good waterproof performance, which can save power consumption, and can also make the electronic device body 1 more light and portable.

The above is only a specific implementation of the present disclosure, but the scope of protection of the present disclosure is not limited thereto. Any person skilled in the art can easily think of changes or replacements within the technical scope disclosed in the present disclosure. These changes or replacements should fall within the protection scope of the present disclosure. Therefore, the protection scope of the present disclosure should be subject to the protection scope of the claims.

I claim:

1. An electronic device, comprising:
    an electronic device body, with a display screen disposed on one side of the electronic device body, the electronic device body comprising at least one folding area and a non-folding area, and the electronic device body and the display screen being foldable along the folding area;
    a folding detection apparatus, disposed on the electronic device body and configured to detect a degree of folding of the electronic device body and send the detected signal to a processor of the electronic device body, the processor being capable of adjusting a display state of the display screen according to the signal detected by the folding detection apparatus, wherein the folding detection apparatus comprises at least one Wheatstone bridge;
    the Wheatstone bridge comprises four resistors, two power signal input terminals and a detection element, and an output terminal of the detection element is electrically connected to the processor; and
    at least one of the four resistors is provided as a varistor, and the at least one varistor is disposed in the folding area.

2. The electronic device of claim 1, wherein the folding detection apparatus is disposed in the folding area.

3. The electronic device of claim 1, wherein the folding detection apparatus is disposed in the folding area and the non-folding area adjacent to the folding area.

4. The electronic device of claim 2, wherein a number of the folding detection apparatus is set to two, and the two folding detection apparatuses are arranged symmetrically on the electronic device body along a length direction of the folding area.

5. The electronic device of claim 1, wherein the detection element is provided as a galvanometer.

6. The electronic device of claim 1, wherein the four resistors comprise a first resistor, a second resistor, a third resistor, and a fourth resistor, the two power signal input terminals comprise a first power signal input terminal and a second power signal input terminal, and the detection element comprise a first detection terminal and a second detection terminal;
    a first terminal of the first resistor and a first terminal of the second resistor are electrically connected to the first power signal input terminal, a second terminal of the fourth resistor and a second terminal of the third resistor are electrically connected to the second power signal input terminal, a second terminal of the first resistor and a first terminal of the fourth resistor are electrically connected to the first detection terminal, and a second terminal of the second resistor and a first terminal of the third resistor are electrically connected to the second detection terminal.

7. The electronic device of claim 6, wherein the first resistor and the fourth resistor are disposed in the folding area, and the second resistor and the third resistor are disposed in the non-folding area adjacent to the folding area;
    wherein, at least one of the first resistor and the fourth resistor is a varistor.

8. The electronic device of claim 1, wherein the display screen comprises a plurality of display panels, and adjacent display panels are rotatably connected.

9. The electronic device of claim 1, wherein the display screen is provided as an integrated flexible display panel.

* * * * *